(12) United States Patent
Shen (10) Patent No.: US 8,560,875 B2
(45) Date of Patent: Oct. 15, 2013

(54) APPARATUS FOR CLOCK CALIBRATING A LESS PRECISE SECOND CLOCK SIGNAL WITH A MORE PRECISE FIRST CLOCK SIGNAL WHEREIN THE FIRST CLOCK SIGNAL IS INACTIVE DURING A SNIFF MODE AND THE SECOND CLOCK SIGNAL IS ACTIVE DURING A SNIFF MODE

(75) Inventor: Kang Shen, Shanghai (CN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 532 days.

(21) Appl. No.: 12/561,919

(22) Filed: Sep. 17, 2009

(65) Prior Publication Data

US 2011/0066874 A1 Mar. 17, 2011

(51) Int. Cl.
*H04B 1/00* (2006.01)
*G06F 1/00* (2006.01)
*G06F 1/12* (2006.01)
*G06F 1/14* (2006.01)

(52) U.S. Cl.
USPC ........... 713/400; 455/574; 713/322; 713/401; 713/500; 713/501

(58) Field of Classification Search
USPC ................ 713/322, 400, 501, 502, 401, 500; 455/258, 574; 327/99; 370/503, 335; 375/354; 702/75
See application file for complete search history.

(56) References Cited

U.S. PATENT DOCUMENTS

| | | | |
|---|---|---|---|
| 6,029,061 A * | 2/2000 | Kohlschmidt | 455/574 |
| 6,931,562 B1 * | 8/2005 | Radjassamy | 713/501 |
| 7,197,341 B2 | 3/2007 | Bultan et al. | |
| 7,200,379 B2 | 4/2007 | Edwards et al. | |
| 2003/0043766 A1 * | 3/2003 | McDonough et al. | 370/335 |
| 2004/0067742 A1 * | 4/2004 | Ormson | 455/258 |
| 2004/0156462 A1 * | 8/2004 | Fuehrer et al. | 375/354 |
| 2005/0138455 A1 * | 6/2005 | Loukianov et al. | 713/400 |
| 2005/0180466 A1 * | 8/2005 | Franchuk et al. | 370/503 |
| 2005/0221870 A1 * | 10/2005 | Erdelyi et al. | 455/574 |
| 2006/0149984 A1 * | 7/2006 | Yasumoto | 713/322 |
| 2006/0155491 A1 * | 7/2006 | Bode | 702/75 |
| 2006/0197558 A1 * | 9/2006 | Starr et al. | 327/99 |
| 2007/0019770 A1 | 1/2007 | Bradley et al. | |
| 2007/0214377 A1 * | 9/2007 | Jarrar et al. | 713/401 |
| 2008/0091967 A1 * | 4/2008 | Solis et al. | 713/502 |
| 2008/0098252 A1 * | 4/2008 | Liu et al. | 713/500 |

OTHER PUBLICATIONS

ATMEL; AVR351: Runtime Calibration and Compensation of RC Oscillators; ATMEL 8-bit AVR Microcontrollers, Application Note; Oct. 2008; p. 1-7.

* cited by examiner

*Primary Examiner* — Thomas Lee
*Assistant Examiner* — Aurel Prifti (57) ABSTRACT

An apparatus for clock calibration on a remote device includes a first oscillator, a second oscillator, and a clock calibration module. The first oscillator generates a first clock signal during an active communication mode to facilitate communications between the remote and host devices. The first oscillator is inactive during a sniff mode. The second oscillator generates a second clock signal during both the active communication and sniff modes. The clock calibration module generates an estimated count for the first clock signal approximately at a transition from the sniff mode to the active communication mode. The estimated count is based on a clock ratio of a baseline count of the first clock signal relative to a baseline count of the second clock signal. The clock calibration module also calculates a difference between the estimated count and an actual count from the host device to determine whether to update the clock ratio.

15 Claims, 5 Drawing Sheets

APPARATUS FOR CLOCK CALIBRATING A LESS PRECISE SECOND CLOCK SIGNAL WITH A MORE PRECISE FIRST CLOCK SIGNAL WHEREIN THE FIRST CLOCK SIGNAL IS INACTIVE DURING A SNIFF MODE AND THE SECOND CLOCK SIGNAL IS ACTIVE DURING A SNIFF MODE

BACKGROUND

Many portable devices rely on a battery or another limited power source for power. In order to conserve power during operation of such a device, the device may use electrical circuitry components that consume a limited amount of power. Also, many devices implement a sleep mode to temporarily turn off the entire device or portions of the device which consume a substantial amount of power. When the device is in the sleep mode, the device consumes relatively little power. In contrast, when the device is in the awake mode, the device consumes more power and, hence, the battery capacity is depleted more quickly.

Turning on and off certain components of a remote device can be complicated when the remote device relies on a highly accurate clock signal for communications with a host, because a high power oscillator is typically required to generate the clock signal with sufficient accuracy. If the high power oscillator is allowed to remain awake in between communications, then the remote device continues to consume a substantial amount of power. However, turning off the high power oscillator can result in calibration problems because the high accuracy clock signal will not be calibrated with the clock signal of the host device when the high power oscillator is turned back on. Thus, the high accuracy clock signal is not synchronized with the clock signal of the host device with which the remote device is intended to communicate. This problem is evident in systems which implement wireless communications using standard Bluetooth® communication protocols. Consequently, it can be difficult to establish a balance between power conservation and communication synchronization.

SUMMARY

Embodiments of an apparatus are described. In one embodiment, the apparatus is a remote device with clock calibration functionality. One embodiment of the apparatus includes a first oscillator, a second oscillator, and a clock calibration module. The first oscillator generates a first clock signal during an active communication mode of the remote device to facilitate communications between the remote device and a host device. The first oscillator is inactive during a sniff mode of the remote device. The second oscillator generates a second clock signal during both the active communication and sniff modes. The second oscillator consumes less power than the first oscillator. The clock calibration module is coupled to the first and second oscillators. The clock calibration module generates an estimated count for the first clock signal approximately at a transition from the sniff mode to the active communication mode. The estimated count for the first clock signal is based on a clock ratio of a baseline count of the first clock signal relative to a baseline count of the second clock signal. The clock calibration module also calculates a difference between the estimated count for the first clock signal and an actual count from the host device to determine whether to update the clock ratio. Other embodiments of the apparatus are also described.

Embodiments of a method are also described. In one embodiment, the method is a method for clock calibration on a remote device. An embodiment of the method includes generating a first clock signal exclusively during an active communication mode of the remote device to facilitate communications between the remote device and a host device. The method also includes generating a second clock signal during both the active communication mode and a sniff mode. The method also includes generating an estimated count for the first clock signal approximately at a transition from the sniff mode to the active communication mode. The estimated count for the first clock signal is based on a clock ratio of a baseline count of the first clock signal relative to a baseline count of the second clock signal. The method also includes calculating a difference between the estimated count for the first clock signal and an actual count from the host device to determine whether to update the clock ratio. Other embodiments of the method are also described.

Embodiments of a computer program product are also described. In one embodiment, the computer program product includes an electronic memory device to store instructions which, when executed on a computer processor, cause the computer processor to implement operations. The operations include an operation to compute a clock ratio a baseline count of the first clock signal relative to a baseline count of the second clock signal. The first clock signal is exclusively operational during an active communication mode, and the second clock signal is operational during both the active communication mode and a sniff mode. The operations also include an operation to generate an estimated count for the first clock signal approximately at a transition from the sniff mode to the active communication mode. The operations also include an operation to receive and store an actual count from a host device. The operations also include an operation to calculate a difference between the estimated count for the first clock signal and the actual count from the host device. The operations also include an operation to determine whether to update the clock ratio based on the difference between the estimated count for the first clock signal and the actual count from the host device. Other embodiments of the computer program product are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments implement functionality for clock calibration in an electronic communication system using, for example, Bluetooth protocol communications. For reference, the communications described herein are between a remote device and a host device. The remote device typically relies on portable battery power, so there can be an incentive to conserve power in order to extend the operations of the remote device. In one embodiment, a method is implemented for clock calibration in Bluetooth sniff mode. The sniff mode is implemented on the remote device to conserve power by putting many or all of the components in a sleep mode for a period. In one embodiment, the remote device includes a high power oscillator (HPO) which is active to generate a high accuracy clock during communications with the host device. In some instances, the high accuracy clock is also referred to as a HPO clock, because there is a correlation between the power consumption of the oscillator and the accuracy of the clock signal. The remote device also includes a low power oscillator (LPO) for use during the sniff mode while the HPO is inactive.

After a remote device receives/transmits packets using the HPO clock in an active mode, the HPO of the remote device is inactivated and only the LPO continues to generate a clock signal with relatively lower accuracy. This allows the remote device to reduce the power consumption and conserve battery power. During the next period of the active communication mode, the clock calibration is performed in two levels. First, a coarse calibration is implemented by calculating an estimated value of the counter of the HPO clock using current and saved values of the counter for the LPO clock. This first calibration reduces and/or minimizes problems related to the temperature and individual differences of each chip.

In the second level of calibration, the difference between estimated HPO clock value and a dedicate value from the host device is calculated and taken into account at the next calibration point to avoid an accumulation of clock error (e.g., drift). This second calibration helps to maintain a stable connection between the remote device and the host device for a longer time (i.e., over several communication cycles).

Figure 1:
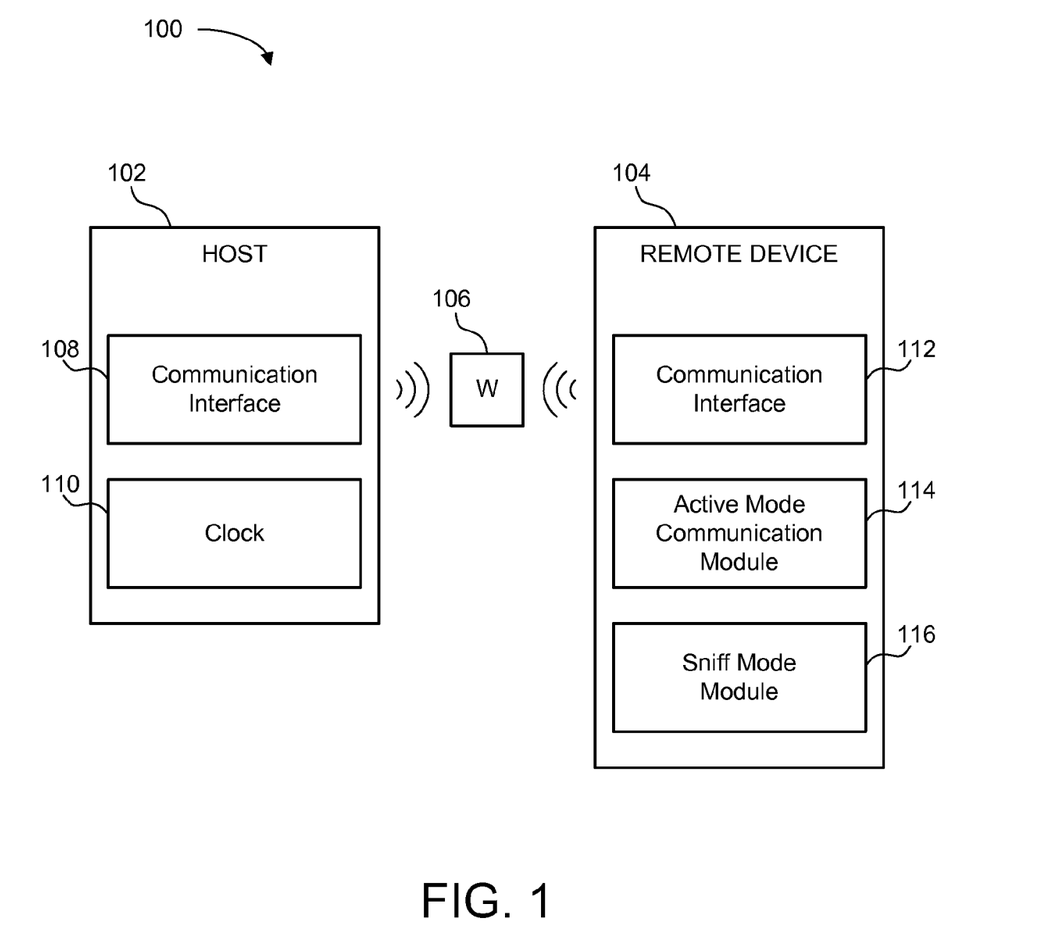
FIG. 1 depicts a schematic block diagram of one embodiment of a communication system with low power oscillator (LPO) clock calibration.

FIG. 1 depicts a schematic block diagram of one embodiment of a communication system 100 with low power oscillator (LPO) clock calibration. The illustrated communication system 100 includes a host device 102 and a remote device 104. The communications between the host and remote devices 102 and 104 allow an access word 106, or another unit of data information, to be transferred between the devices 102 and 104.

The illustrated host device 102 includes a communication interface 108 and a host clock 110. In general, the communication interface 108 facilitates the communications with the remote device 104. In some embodiments, the communication interface 108 includes transceiver hardware circuitry and/or software to implement a specific communications protocol such as Bluetooth. Other embodiments may use another communication protocol. The host clock 110 generates a local clock signal that is used by the communication interface 108 to synchronize the communications between the host device 102 and the remote device 108.

Figure 2:
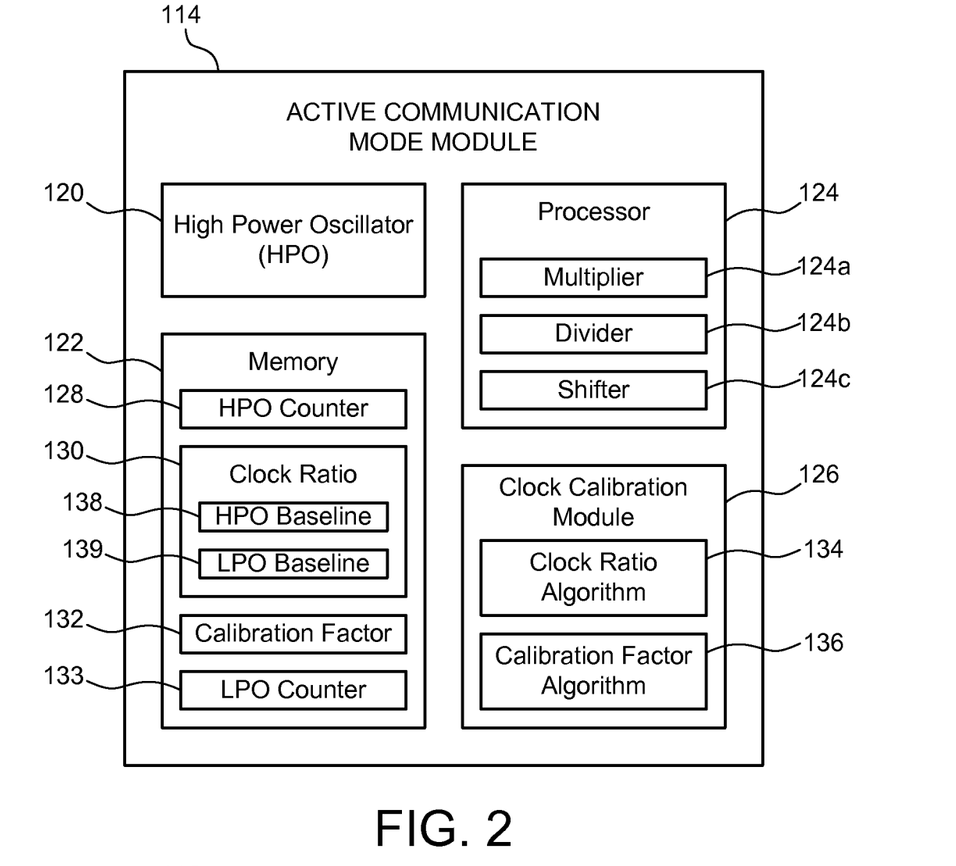
FIG. 2 depicts a schematic block diagram of one embodiment of the active mode communication module of the remote device of FIG. 1.
Figure 3:
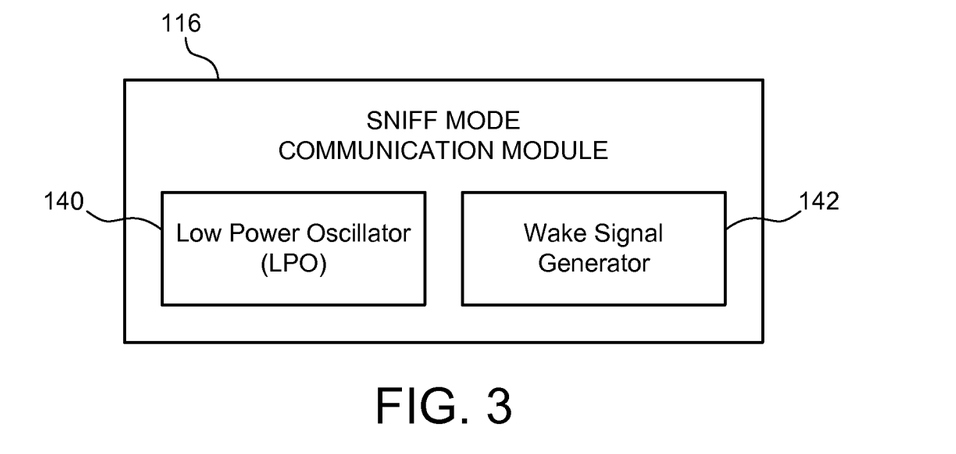
FIG. 3 depicts a schematic block diagram of one embodiment of the sniff mode communication module of the remote device of FIG. 1.

The illustrated remote device 104 includes a communication interface 112, an active communication mode module 114, and a sniff mode module 116. The communication interface 112 of the remote device 104 is substantially similar to the communication interface 108 of the host device 102. The active mode communication module 114 also facilitates communications with the host device 102 during the active communications mode when the remote device 102 is fully operational. One example of an embodiment of the active communications mode module 114 is shown in FIG. 2 and described in more detail below. The sniff mode module 116 maintains reduced functionality of the remote device 104 during the sleep periods in between the active communication mode periods of the remote device 104. One example of an embodiment of the sniff mode module 116 is shown in FIG. 3 and described in more detail below.

FIG. 2 depicts a schematic block diagram of one embodiment of the active communication mode module 114 of the remote device 104 of FIG. 1. The illustrated active communication mode module 114 includes a HPO 120, an electronic memory device 122, a processor 124, and a clock calibration module 126. Although the illustrated embodiment of the active communication mode module 114 is shown and described with certain components and functionality, other embodiments may include fewer or more components to implement less or more functionality.

Additionally, in some embodiment, at least some of the components and/or functionality described herein may be shared between the active communication mode module 114 and the sniff mode module 116. For example, the electronic memory device 122 may be accessible by both the active communication mode module 114 and the sniff mode module 116. As another example, the processor 124 may execute processing operation for both the active communication mode module 114 and the sniff mode module 116. Additionally, some or all of the functionality of the clock calibration module 126 may be available to both the active communication mode module 114 and the sniff mode module 116. In fact, some embodiments of the remote device 104 may implement the electronic memory device 122, the processor 124, and/or the clock calibration module 126 on a single chip accessible by both the active communication mode module 114 and the sniff mode module 116.

In one embodiment, the HPO 120 generates a first clock signal during an active communication mode of the remote device 104 to facilitate communications between the remote device 104 and the host device 102. For convenience, this first clock signal is referred to as the HPO clock signal or the high accuracy clock signal. In order to conserve power when the HPO clock signal is not needed (i.e., when the remote device 104 is not actively communicating with the host device 102), the HPO 120 is inactive during a sniff mode of the remote device 104.

In one embodiment, the electronic memory device 122 stores parameters and/or instructions used by the active communication mode module 114. The electronic memory device 122 may be any type of volatile or non-volatile memory. In one embodiment, the electronic memory device 122 may store one or more values for an HPO counter 128, which increments with each clock cycle during the time that the HPO 120 is active. In the depicted embodiment, the electronic memory device 122 also stores a clock ratio 130 and a calibration factor 132. The clock ratio 130 and the calibration factor 132 are described in more detail below.

In one embodiment, the processor 124 executes instructions to implement the functional operations of the active communication mode module 114. The instructions may be store, for example, on the electronic memory device 122, within a memory component of the processor 124, or in another location accessible by the processor 124. In the illustrated embodiment, the processor 122 includes a multiplier 124a, a divider 124b, and a shifter 124c. In one embodiment, the processor 122 is configured to operate primarily on integer parameters, so the multiplier 124a is an integer multiplier and the divider 124b is an integer divider. In order to increase the accuracy of the multiplication and division operations, the shifter 124c left-shifts bits of a dividend prior to a division operation and right-shifts bits of a product after a multiplication operation. The amount of shifting may be fixed or configurable.

In one embodiment, the clock calibration module 126 is a functional module that is operably coupled to the HPO 120, the electronic memory device 122, and the processor 124. More specifically, the calibration module 126 may be implemented in hardware and/or software and, furthermore, may be integrated with one or more of the HPO 120, the electronic memory device 122, and/or the processor 124. In other words, certain physical components or software instructions which impart functionality to the clock calibration module 124 may be physically combined with or stored within another component of the active communication mode module 114. The illustrated clock calibration module 126 includes a clock ratio algorithm 134 and a calibration factor algorithm 136.

Prior to describing the functionality of the clock calibration module 126 and the related algorithms 134 and 136, it may be useful to reference the description of the sniff mode module 116. FIG. 3 depicts a schematic block diagram of one embodiment of the sniff mode module 116 of the remote device 104 of FIG. 1. The illustrated sniff mode module 116 includes a LPO 140 and a wake signal generator 142. Although the illustrated embodiment of the sniff mode module 116 is shown and described with certain components and functionality, other embodiments may include fewer or more components to implement less or more functionality. For example, other embodiments of the sniff mode module 116 may include further components such as an electronic memory device and a processor, which could be substantially similar to the electronic memory device 122 and the processor 124 of the active communication mode module 114. However, it should be noted that the inclusion of addition components would increase the power consumption of the sniff mode module 116. Additionally, in some embodiments, at least some of the components and/or functionality described herein may be shared between the active communication mode module 114 and the sniff mode module 116, as described above.

In one embodiment, the LPO 140 generates a second clock signal that is different from the HPO clock signal. For convenience, this second clock signal is referred to as the LPO clock signal or the low accuracy clock signal. As explained above, the LPO clock signal is generated during both the active communication mode and the sniff mode of the remote device 104. In contrast to the HPO clock signal, the LPO clock signal is not used directly for communications between the remote device 104 and the host device 102. Rather, the LPO clock signal is used to maintain a reduced level of coordination between the remote device 104 and the host device 102 during the sniff mode when there are no communications between the remote device 104 and the host device 102. More specifically, the LPO clock signal is used during the sniff mode to wake up the active communication module 114 approximately after a predetermined lapse of time. For example, after the lapse of a predetermined number of LPO clock cycles, the wake signal generator 142 sends a wakeup signal to turn on the active communication mode module 114. In this way, the LPO clock signal conserves power when the HPO clock signal is not needed during the sniff mode period because the LPO 140 consumes substantially less power than the HPO 120. As one example, the LPO 140 may generate a 32 kHz clock signal and consume approximately 0.1% (i.e., $\frac{1}{1000}$th) of the power consumed by the HPO 120 which generates a 12 MHz clock signal. However, the relative power consumption and actual clock signal frequency of each oscillator may vary with different embodiments.

Unfortunately, the lower power consumption of the LPO 140 results in lower accuracy and drift of the LPO clock signal. In terms of stability, the LPO 140 may generate a signal with a stability of approximately 5000 ppm, whereas the HPO 120 may generate a signal with a stability of approximately 20 ppm. This difference in stability results in a greater amount of drift of the LPO clock signal. As one example, the LPO clock signal may drift approximately 30%. This amount of drift is excessive and unacceptable for the communications between the remote device 104 and the host device 102, which requires a much higher level of accuracy of the HPO clock signal used for the communications. For this reason, the HPO clock signal is used during the active communication mode and the LPO clock signal is used during the sniff mode in between communications. Additionally, the LPO clock signal is continually generated during the active communication mode in order to maintain consistency from one sniff mode period to the next sniff mode period.

Figure 4:
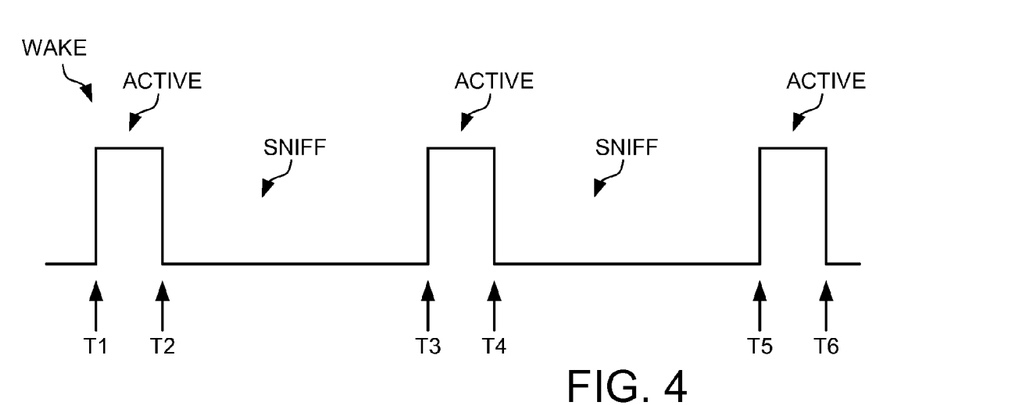
FIG. 4 depicts a signal diagram of one embodiment of a wake signal used to implement the active and sniff modes in the remote device of FIG. 1.

For reference, FIG. 4 depicts a signal diagram of one embodiment of a wake signal, WAKE, used to implement the active and sniff modes in the remote device 104 of FIG. 1. In particular, the remote device 104 is in the active communication mode between times T1 and T2, between times T3 and T4, and between times T5 and T6. In between the active communication mode periods, the remote device 104 is in the sniff mode. In particular, the remote device 104 is in the sniff mode between times T2 and T3 and between times T4 and T5.

Figure 5:
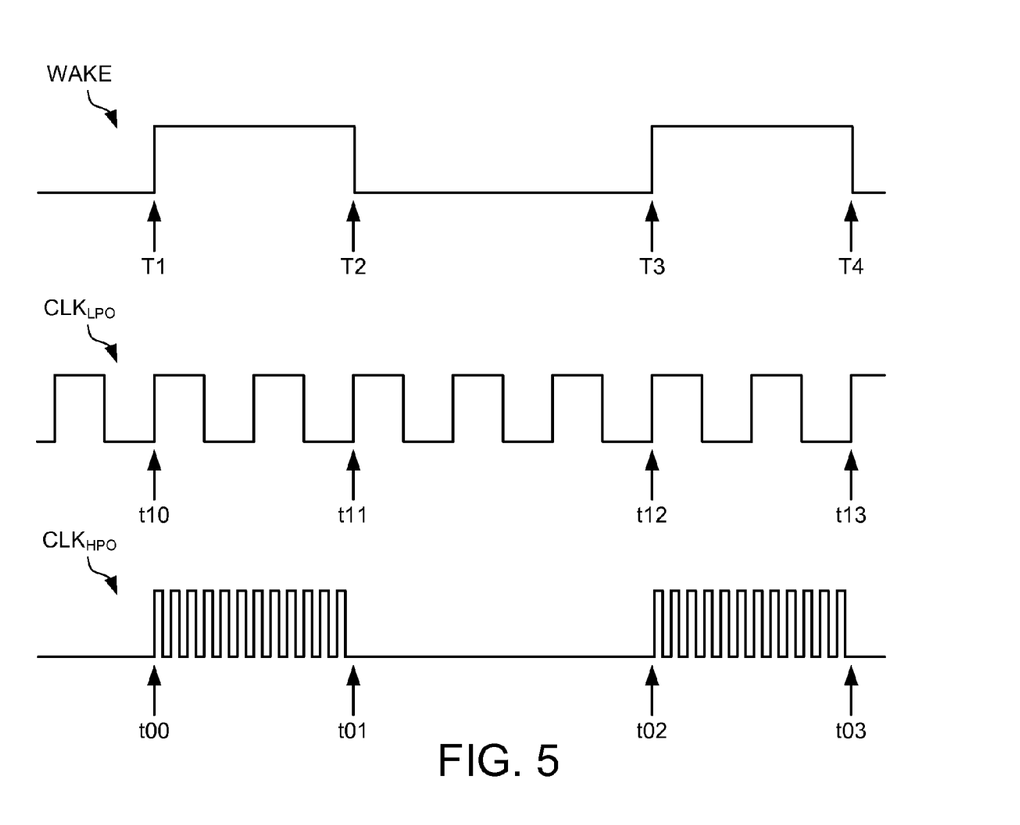
FIG. 5 depicts a signal diagram of one embodiment of a correlation between the wake signal and the clock signals generated by the remote device of FIG. 1.

FIG. 5 depicts a signal diagram of one embodiment of a correlation between the wake signal, WAKE, and the clock signals, $CLK_{LPO}$ and $CLK_{HPO}$, generated by the remote device 104 of FIG. 1. For reference, the LPO clock signal generated by the LPO 140 is labeled in FIG. 5 as $CLK_{LPO}$. Similarly, the HPO clock signal generated by the HPO 120 is labeled in FIG. 5 as $CLK_{HPO}$. As explained above, the LPO clock signal is consistently generated during both the active communication mode period (e.g., between T1 and T2) and the sniff mode period (e.g., between T2 and T3), while the HPO clock signal is only generated during each active communication mode period (e.g., between T1 and T2).

FIG. 5 also indicates several clock counter values which are stored, at least temporarily, in at least the electronic memory device 122. For example, some of the values for the LPO clock signal may be stored as corresponding values for the LPO counter 133 within electronic memory device 122 (in addition to other parameters and/or instructions) of the active communication mode module 114. Specifically, at time T1, the LPO clock value t10 and the HPO clock value t00 are stored. At time T2, the LPO clock value t11 and the HPO clock value T01 are stored. At time T3, the LPO clock value t12 and the HPO clock value T02 are stored. At time T4, the LPO clock value t13 and the HPO clock value T03 are stored. These values are used, in one embodiment, within the algorithms that are executed by the clock calibration module 126.

Referring again to FIG. 2, the clock calibration module 126 of the active communication mode device 114 generally functions to calibrate the LPO and HPO clock signals during the operation of the remote device. More specifically, the clock calibration module 126 calibrates the HPO clock signal to the LPO clock signal each time the remote device 104 transitions from the sniff mode to the active communication mode. Also, the clock calibration module 126 calibrates the HPO clock signal to a dedicate value from the host device 102 during the active communication mode period.

In one embodiment, the clock calibration module 126 generates an estimated count for the HPO clock signal approximately at a transition from the sniff mode to the active communication mode. The estimated count for the first clock signal is based on a clock ratio of a baseline count 138 of the HPO clock signal relative to a baseline count 139 of the LPO clock signal, which may be stored as separate integer values within the electronic memory device 122. In other words, the LPO clock signal is used to determine when to wake up the remote device 104 and to assign an estimated value to the HPO clock signal so that the remote device 104 can communicate with the host device 102 during the following active communication mode.

The clock calibration module 126 also uses this estimated count to calculate a difference between the estimated count for the HPO clock signal and an actual count (i.e., the dedicate value) from the host device 102 to determine whether to update the clock ratio. If the estimated count for the HPO clock signal is different from the actual count from the host device 102, then the clock calibration module 126 updates the clock ratio so that the clock ratio error does not accumulate over a series of communication cycles. In a specific embodiment, the clock calibration module 126 updates the clock ratio by adjusting the baseline count 138 of the HPO clock signal.

In one embodiment, the clock ratio is calculated during an initial period in which the HPO 120 and the LPO 140 are both active and generating corresponding clock signals. The clock ratio is simply a ratio of the HPO clock count to the LPO clock count over the same period. The algorithm to calculate this ratio may be part of the clock ratio algorithm. As one example, the LPO 140 may count from 0 to 0x8000 (2^15 binary) and record the count of the HPO clock signal when the LPO clock signal reaches 0x8000. With reference to FIG. 5, using the time period from T1 to T2 as the initial period for calculating the clock ratio, the clock ratio could be expressed as follows:

$$\frac{(t01 - t00)}{(t11 - t10)} \text{ or, for example, } \frac{(t01 - t00)}{0 \times 8000}.$$

In order to update the clock ratio, the clock calibration module 126 may update the HPO value by adjusting the value of (t01–t00) in the previous equation. The adjustment value is referred to herein as Δ(t01–t00). In one embodiment, the clock calibration module 126 calculates the adjustment amount to update the clock ratio according to the following algorithm:

$$\Delta(t01 - t00) = \Delta T \frac{(t11 - t10)}{(t12 - t11)},$$

in which Δ(t01–t00) represents an adjustment amount applied to the baseline count of the HPO clock signal, ΔT represents a calibration factor which is the difference between the estimated count for the HPO clock signal and the actual count from the host device, (t11–t10) represents the baseline count (e.g., 0x8000) of the LPO clock signal, and (t12–t11) represents the incremental count of the LPO clock signal approximately during the sniff mode. This algorithm may be part of the clock ratio algorithm. The calibration factor, ΔT, is calculated according to the calibration algorithm, as follows:

$$\Delta T = t0 - T,$$

in which t0 represents the estimated value of the HPO clock signal at a given time, and T represents the dedicate value from the host device 102 at the same given time. Since the estimated value of the HPO clock signal should be the same as the dedicate value of the host device 102 at the same time, the difference between these values can be used to evaluate the accuracy of the clock ratio and to update the clock ratio accordingly. As explained above, the calculations for the calibration factor and/or the clock ratio may be performed as integer operations, so the processor 124 (may use a shifter 124c to shift the values accordingly during the multiplication and division operations.

In some embodiments, the clock calibration module 126 is implemented on the sniff mode module 116 so that the updates to the clock ratio can be calculated during the sniff mode, in which case the operations may be performed by processor (not shown) of the sniff mode module 116. Accordingly, the values used in these operations also may be stored by an electronic memory device (not shown) of the sniff mode module 116, or by another memory device (not shown) accessible by the sniff mode module 116.

In another embodiment, if the clock calibration module 126 determines that the value of the estimated HPO clock signal is the same as the dedicate value, then the clock calibration module 126 can forego updating the clock ratio for at least one iteration. More specifically, the clock calibration module 126 can forego updating the HPO baseline count 138. Also, the value of the HPO clock signal can be synchronized with the dedicate value from the host 102. Also, the clock calibration module 126 can forego updating the clock ratio if the increment value of the LPO clock signal is below a threshold, because a small divisor value in the calculation of the adjustment amount for the baseline value for the HPO clock signal could have an overly dramatic effect on the calculated adjustment amount. Other embodiments may implement further controls to ensure the validity of the adjustment amount that may be applied to the clock ratio.

Figure 6:
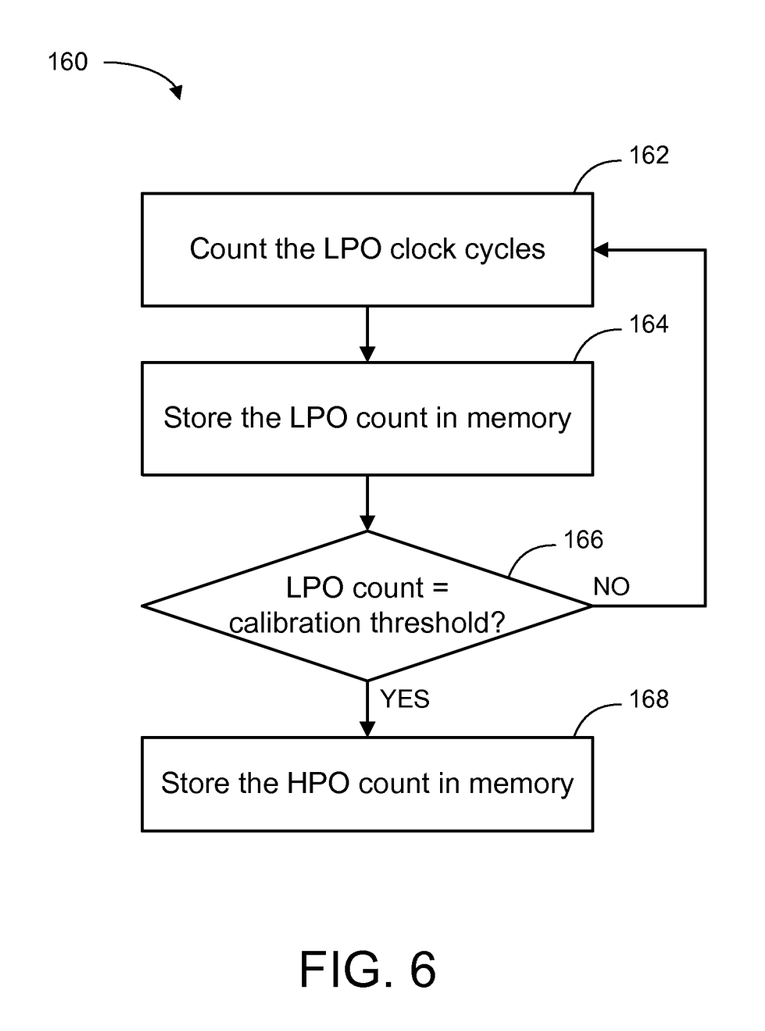
FIG. 6 depicts a flow chart diagram of one embodiment of a method for calculating the clock ratio based on the clock signals generated by the remote device of FIG. 1.

FIG. 6 depicts a flow chart diagram of one embodiment of a method 160 for calculating the clock ratio based on the clock signals generated by the remote device 104 of FIG. 1. As explained above, this method 160 may be implemented during an initial period prior to communications between the remote device 104 and the host device 102. Although the method 160 is shown and described in conjunction with the remote device 104 of FIG. 1, other embodiments of the method 160 may be implemented in conjunction with other remote devices.

At block 162, the remote device 104 counts the number of LPO clock cycles. At block 164, the remote device 104 stores the LPO count in the memory 122. At block 166, the remote device 104 determines if the LPO count is equal to a calibration threshold (e.g., 0x8000). If not, then the remote device continues to increment the LPO counter. Once the LPO count reaches the calibration threshold, at block 168 the remote device 104 stores the corresponding HPO count in the memory 122. Together, the stored values for the LPO count and the HPO count represent the clock ratio. In one embodiment, the LPO and HPO counts are stored as integer values. In another embodiment, the clock ratio may be calculated and stored as a separate value. The depicted method 160 then ends. As mentioned above, this clock ratio can be used to estimate the value of the HPO clock signal at the end of the following sniff mode, or prior to transitioning from the current active communication mode to the sniff mode, so that the correct value for the HPO clock signal is used during the subsequent active communication mode.

Figure 7:
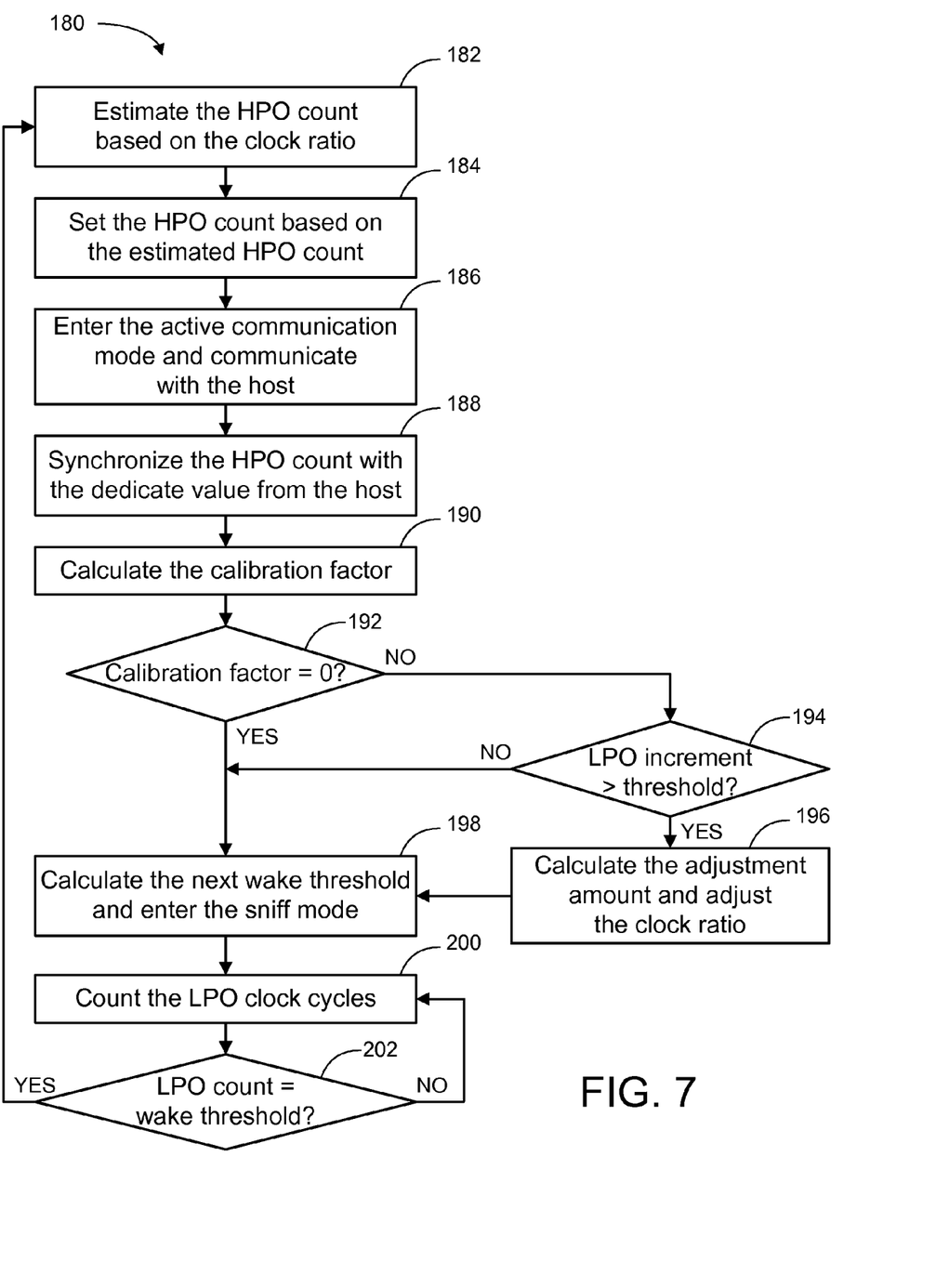
FIG. 7 depicts a flow chart diagram of one embodiment of a method for calibrating the clock signals generated by the remote device of FIG. 1 during operation of the remote device in the active communication and sniff modes.

FIG. 7 depicts a flow chart diagram of one embodiment of a method 180 for calibrating the clock signals generated by the remote device 104 of FIG. 1 during operation of the remote device 104 in the active communication and sniff modes. Although the method 180 is shown and described in conjunction with the remote device 104 of FIG. 1, other embodiments of the method 180 may be implemented in conjunction with other remote devices.

At block 182, while the remote device 104 is in the sniff mode, the remote device 104 estimates the value for the HPO clock signal based on the clock ratio. At block 184, the remote device 104 sets the HPO count to the estimated value. Using this estimated value, at block 186 the remote device 104 enters the active communication mode and communicates with the host device 102. In some embodiments, at block 188 the remote device 104 also synchronizes the HPO count with the dedicate value from the host device 102.

Then, at block 190 the remote device 104 calculates the calibration factor to determine if there is a difference between the estimated HPO count and the dedicate value from the host device 102. Specifically, the host device 102 determines at block 192 whether the calibration factor is zero or another value. If the calibration factor is not zero, then there is a difference between the estimated HPO count and the dedicate value. In this case, at block 194 the remote device 104 determines if the increment value of the LPO clock signal from the previous sniff mode period reached the calibration threshold. This ensures that the LPO increment value used in the adjustment amount calculation is reasonable. If the LPO increment value is sufficient, then at block 196 the remote device 104 calculates the adjustment amount and adjusts the clock ratio, accordingly.

If the calibration factor is zero, then there is no difference between the estimated HPO count and the dedicate value. In this case, at block 198 the remote device 104 calculates the wake threshold for the next sniff mode period and enters the sniff mode. In one embodiment, the wake threshold is calculated based on the clock ratio (to correlate a particular number of HPO clock cycles with a number of LPO clock cycles) and an anticipated duration of the wake period). As explained above, the HPO 120 turns off during the sniff mode in order to conserve power.

Within the sniff mode, at block 200 the remote device 104 focuses on counting the LPO clock cycles. Similarly, if the LPO increment value is not sufficient, or after adjusting the clock ratio, the remote device 104 similarly focuses on counting the LPO clock cycles. At block 202, the remote device 104 determines if the LPO count reaches a wake threshold. If the LPO count reaches the wake threshold, then the remote device returns to block 182 to estimate the new HPO count based on the updated clock ratio (if the clock ratio was updated at block 198) or the former clock ratio (if the clock ratio was not updated at block 198). Otherwise, if the LPO count has not reached the wake threshold, then the remote device 104 returns to block 200 and continues to monitor the LPO count until the LPO count reaches the wake threshold. The depicted method 180 continues in this manner during the operation of the remote device 104.

Although the calculations for the clock ratio are shown in FIG. 7 and described above as occurring within the active communication mode, other embodiments of the clock configuration module 126 perform some or all of the operations to calculate the clock ratio within the sniff mode period between active communication mode periods.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform the operations described herein.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An apparatus for clock calibration on a remote device, the apparatus comprising:
a first oscillator to generate a first clock signal during an active communication mode of the remote device to facilitate communications between the remote device and a host device, wherein the first oscillator is inactive during a sniff mode of the remote device;
a second oscillator to generate a second clock signal during both the active communication and sniff modes, wherein the second oscillator consumes less power than the first oscillator; and
a clock calibration module coupled to the first and second oscillators, the clock calibration module to:
generate an estimated count for the first clock signal approximately at a transition from the sniff mode to the active communication mode, wherein the estimated count for the first clock signal is based on a clock ratio of a baseline count of the first clock signal relative to a baseline count of the second clock signal;
calculate a difference between the estimated count for the first clock signal and an actual count from the host device to determine whether to update the clock ratio;
forego updating the clock ratio in response to a determination that an incremental count of the second clock signal approximately during the sniff mode is less than a threshold amount; and
update the clock ratio, according to the following algorithm:

$$\Delta(t01 - t00) = \Delta T \frac{(t11 - t10)}{(t12 - t11)},$$

in which $\Delta(t01-t00)$ represents an adjustment amount applied to the baseline count of the first clock signal, $\Delta T$ represents a calibration factor which is the difference between the estimated count for the first clock signal and the actual count from the host device, $(t11-t10)$ represents the baseline count of the second clock signal, and $(t12-t11)$ represents the incremental count of the second clock signal approximately during the sniff mode.

2. The apparatus of claim 1, wherein the second clock signal from the second oscillator has a lower frequency and is less accurate than the first clock signal from the first oscillator.

3. The apparatus of claim 1, wherein the clock calibration module is configured to update the clock ratio based on a determination that the estimated count for the first clock signal is different from the actual count from the host device.

4. The apparatus of claim 3, wherein the clock calibration module is configured to update the clock ratio by adjusting the baseline count of the first clock signal.

5. The apparatus of claim 3, wherein the clock calibration module is configured to update the clock ratio further based on the baseline count of the second clock signal and an incremental count of the second clock signal.

6. The apparatus of claim 1, wherein the clock calibration module is configured to update the clock ratio during the active communication mode while the first clock signal is active.

7. The apparatus of claim 1, wherein the clock calibration module is further configured to synchronize the estimated count for the first clock signal with the actual count from the host device by setting the estimated count for the first clock signal to the actual count from the host device.

8. The apparatus of claim 7, wherein the clock calibration module is configured to synchronize the estimated count for the first clock signal with the actual count from the host device during the active communication mode.

9. The apparatus of claim 1, further comprising an electronic memory device coupled to the clock calibration module, the electronic memory device to store the baseline count for the first clock signal, the baseline count for the second clock signal, the estimated count for the first clock signal, and the actual count from the host device.

10. The apparatus of claim 9, further comprising a processor coupled to the electronic memory device to facilitate calculating the difference between the estimated count for the first clock signal and the actual count from the host device, wherein the processor comprises:
an integer multiplier;
an integer divider; and a bit shifter, wherein the bit shifter is configured to left-shift bits of a dividend prior to a division operation and to right-shift bits of a product after a multiplication operation.

11. A method for clock calibration on a remote device, the method comprising:
generating a first clock signal exclusively during an active communication mode of the remote device to facilitate communications between the remote device and a host device;
generating a second clock signal during both the active communication mode and a sniff mode;
generating an estimated count for the first clock signal approximately at a transition from the sniff mode to the active communication mode, wherein the estimated count for the first clock signal is based on a clock ratio of a baseline count of the first clock signal relative to a baseline count of the second clock signal;
calculating a difference between the estimated count for the first clock signal and an actual count from the host device to determine whether to update the clock ratio;
foregoing an update of the clock ratio in response to a determination that an incremental count of the second clock signal approximately during the sniff mode is less than a threshold amount; and
updating the clock ratio, wherein updating the clock ration further comprises adjusting the baseline count of the first clock signal relative to the baseline count of the second clock signal based on an incremental count of the second clock signal, according to the following algorithm:

$$\Delta(t01 - t00) = \Delta T \frac{(t11 - t10)}{(t12 - t11)},$$

in which $\Delta(t01-t00)$ represents an adjustment amount applied to the baseline count of the first clock signal, $\Delta T$ represents a calibration factor which is the difference between the estimated count for the first clock signal and the actual count from the host device, $(t11-t10)$ represents the baseline count of the second clock signal, and $(t12-t11)$ represents the incremental count of the second clock signal approximately during the sniff mode.

12. The method of claim 11, further comprising updating the clock ratio based on a determination that the estimated count for the first clock signal is different from the actual count from the host device.

13. The method of claim 11, further comprising calculating the difference between the estimated count for the first clock signal and the actual count from the host device during the active communication mode.

14. The method of claim 11, further comprising synchronizing the estimated count for the first clock signal with the actual count from the host device by setting the estimated count for the first clock signal to the actual count from the host device during the active communication mode.

15. A computer program product comprising:
a non-transitory electronic memory device to store instructions which, when executed on a computer processor, cause the computer processor to implement operations comprising:
compute a clock ratio a baseline count of the first clock signal relative to a baseline count of the second clock signal, wherein the first clock signal is exclusively operational during an active communication mode, and the second clock signal is operational during both the active communication mode and a sniff mode;
generate an estimated count for the first clock signal approximately at a transition from the sniff mode to the active communication mode;
receive and store an actual count from a host device;
calculate a difference between the estimated count for the first clock signal and the actual count from the host device;
determine whether to update the clock ratio based on the difference between the estimated count for the first clock signal and the actual count from the host device;
forego the update of the clock ratio in response to a determination that an incremental count of the second clock signal approximately during the sniff mode is less than a threshold amount; and
update the clock ratio, based on a determination that the estimated count for the first clock signal is different from the actual count from the host device, according to the following algorithm:

$$\Delta(t01 - t00) = \Delta T \frac{(t11 - t10)}{(t12 - t11)},$$

in which $\Delta(t01-t00)$ represents an adjustment amount applied to the baseline count of the first clock signal, $\Delta T$ represents a calibration factor which is the difference between the estimated count for the first clock signal and the actual count from the host device, $(t11-t10)$ represents the baseline count of the second clock signal, and $(t12-t11)$ represents the incremental count of the second clock signal approximately during the sniff mode.

* * * * *